United States Patent
Ogihara et al.

(10) Patent No.: US 12,406,977 B2
(45) Date of Patent: *Sep. 2, 2025

(54) METHOD FOR PRODUCING AN ANODE FOR A LITHIUM-ION BATTERY, AND LITHIUM-ION BATTERY

(71) Applicant: Bayerische Motoren Werke Aktiengesellschaft, Munich (DE)

(72) Inventors: Hideki Ogihara, Haimhausen (DE); Thomas Woehrle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 104 days.

This patent is subject to a terminal disclaimer.

(21) Appl. No.: 18/276,699

(22) PCT Filed: Feb. 11, 2022

(86) PCT No.: PCT/EP2022/053381
§ 371 (c)(1),
(2) Date: Aug. 10, 2023

(87) PCT Pub. No.: WO2022/171803
PCT Pub. Date: Aug. 18, 2022

(65) Prior Publication Data
US 2024/0105905 A1    Mar. 28, 2024

(30) Foreign Application Priority Data
Feb. 15, 2021  (DE) .............. 10 2021 103 508.2

(51) Int. Cl.
*H01M 4/04*  (2006.01)
*H01M 4/139*  (2010.01)

(52) U.S. Cl.
CPC ....... *H01M 4/0419* (2013.01); *H01M 4/0404* (2013.01); *H01M 4/0435* (2013.01); *H01M 4/139* (2013.01)

(58) Field of Classification Search
None
See application file for complete search history.

(56) References Cited

U.S. PATENT DOCUMENTS

| 3,642,538 A | 2/1972 | Zito, Jr. |
| 2016/0118651 A1* | 4/2016 | Kovalev ............... H01M 4/628 156/60 |
| 2017/0103857 A1* | 4/2017 | Kagawa ................. H01M 4/80 |

(Continued)

FOREIGN PATENT DOCUMENTS

| CN | 111952539 A | 11/2020 |
| DE | 2 053 572 A1 | 5/1971 |

(Continued)

OTHER PUBLICATIONS

Machine translation.*
International Search Report (PCT/ISA/210) issued in PCT Application No. PCT/EP2022/053378 dated Jul. 4, 2022 with English translation (5 pages).

(Continued)

*Primary Examiner* — Austin Murata
(74) *Attorney, Agent, or Firm* — Crowell & Moring LLP

(57) ABSTRACT

A method for producing an anode for a lithium-ion battery includes providing an anode collector carrier film and applying a coating compound onto at least one main surface of the anode collector carrier film. The coating compound contains a particulate auxiliary material. The coating compound is subsequently compressed to form an anode film on the anode collector carrier film. During the compression of the coating compound, the anode collector carrier film is perforated. A lithium-ion battery is also described.

20 Claims, 2 Drawing Sheets

(56) References Cited

U.S. PATENT DOCUMENTS

2020/0020906 A1* 1/2020 Kim .................... H01M 50/342
2022/0311038 A1   9/2022 Seno et al.
2022/0376266 A1* 11/2022 Hong .................... H01M 4/38

FOREIGN PATENT DOCUMENTS

| EP | 3 012 885 A1 | 4/2016 |
|----|----|----|
| EP | 3012885 * | 4/2016 |
| EP | 3 249 718 A1 | 11/2017 |
| JP | 2018-55943 * | 4/2018 |
| JP | 2018-55943 A | 4/2018 |
| WO | WO 2020/218334 A1 | 10/2020 |

OTHER PUBLICATIONS

German-language Written Opinion (PCT/ISA/237) issued in PCT Application No. PCT/EP2022/053378 dated Jul. 4, 2022 with English translation (8 pages).

German-language Search Report issued in German Application No. 10 2021 103 510.4 dated Oct. 26, 2021 with partial English translation (13 pages).

International Search Report (PCT/ISA/210) issued in PCT Application No. PCT/EP2022/053381 dated Jul. 4, 2022 with English translation (5 pages).

German-language Written Opinion (PCT/ISA/237) issued in PCT Application No. PCT/EP2022/053381 dated Jul. 4, 2022 with English translation (6 pages).

German-language Search Report issued in German Application No. 10 2021 103 508.2 dated Oct. 27, 2021 with partial English translation (13 pages).

* cited by examiner

S1　　　　　　S2　　　　　　S3

METHOD FOR PRODUCING AN ANODE FOR A LITHIUM-ION BATTERY, AND LITHIUM-ION BATTERY

CROSS REFERENCE TO RELATED APPLICATION

This application contains subject matter related to U.S. application Ser. No. 18/276,691, entitled "Method for Producing a Cathode for a Lithium-Ion Battery, and Lithium-Ion Battery," filed on even date herewith.

BACKGROUND AND SUMMARY

The invention relates to a method for producing an anode for a lithium ion battery and also to a lithium-ion battery.

Below, the term "lithium-ion battery" is used synonymously for all customary prior-art designations for lithium-containing galvanic elements and cells, such as, for example, lithium battery, lithium cell, lithium-ion cell, lithium polymer cell, lithium-ion battery cell, and lithium-ion accumulator. The term includes, in particular, rechargeable batteries (secondary batteries). The terms "battery" and "electrochemical cell" are also utilized synonymously with the terms "lithium-ion battery" and "lithium-ion cell."

A lithium-ion battery has at least two different electrodes: a positive (cathode) and a negative (anode) electrode. Each of these electrodes comprises at least one active material, optionally together with adjuvants such as electrobinders and electrical conductivity adjuvants.

During the production of a lithium-ion battery, sufficient wetting of the electrodes with electrolyte is of key importance for the attainable performance features of the lithium-ion battery—for example, for the current-carrying capacity, the maximum charging and discharging currents, the cycling stability, and/or the lifetime.

The active materials and also passive materials present in the electrodes are each applied to a carrier foil which is customarily formed of a metal and is utilized for the electrical contacting of the respective electrode. Such foils are impervious to the electrolyte, and consequently complete wetting of the electrode by the electrolyte may be hindered, reduced and/or slowed down.

In order to improve the wetting behavior, the prior art has disclosed carrier foils with prefabricated apertures which allow the electrolyte to penetrate the carrier foil and in this way allow the wetting behavior to be improved.

A disadvantage of such carrier foils, however, is that the apertures present reduce their mechanical stability and robustness, resulting in the possibility of damage and/or deformation during the production and/or handling of the electrode. Costly and complicated electrode production processes may also be necessary in order to hinder the coating compounds applied to the carrier foil from dripping through the apertures present, and to prevent the accumulation of dirt in the apertures. Furthermore, carrier foils with prefabricated apertures or porosity, such as perforated foils or extended metals, for example, are more expensive than simple carrier foils without such apertures.

It is an object of this disclosure to provide a method for producing anodes having good wetting behavior. A further object of the disclosure is to provide a lithium-ion battery having good performance features.

The object of the disclosure may be achieved by a method for producing an anode for a lithium-ion battery that includes the following steps. An anode collector carrier foil is provided and a coating compound which comprises a particulate auxiliary material is applied to at least one side of the anode collector carrier foil. The coating compound is subsequently compressed to form an anode film on the anode collector carrier foil, and the anode collector carrier foil is perforated by the particulate auxiliary material during the compression of the coating compound.

In accordance with this disclosure, during the production of the anode, the anode collector carrier foil is provided in situ with at least one aperture. The at least one aperture enables outstanding wettability, with an electrolyte, of the anode produced by the method of the disclosure. This enables rapid, uniform, and complete wetting of the anode with electrolyte as soon as the anode is installed in a lithium-ion battery.

At the same time, commercial anode collector carrier foils without prefabricated apertures, as are known in the prior art, can be used. Examples include rolled copper foils, which are available worldwide readily and inexpensively.

Moreover, the advantage arises that the anode collector carrier foil remains mechanically robust during the production of the anode, so that no costly and complicated adaptations to manufacturing lines for the production of the anode, or downstream manufacturing steps for the assembly of lithium-ion batteries with such an anode, are necessary.

The anode collector carrier foil may be more particularly a copper foil and may serve as a current output conductor of the anode.

The particulate auxiliary material may be, in accordance with this disclosure, harder than the anode collector carrier foil, in order to be able to perforate it.

The term "perforating" is understood here and below to be the generation of at least one aperture extending through the entire thickness of the anode collector carrier foil.

The coating compound may be compressed via any method known in the prior art. The coating compound may be compressed more particularly by calendering.

In cross section, in other words parallel to a main face of the anode collector carrier foil to which the coating compound has been applied, the apertures may have any desired shape—for example, circular, arcuate and/or polygonal. The shape of the cross section may be substantially dependent on the morphology of the particulate auxiliary material and also on the method employed for compressing the coating compound.

In order to simplify the perforating of the anode collector carrier foil, the coating compound may be applied to the anode collector carrier foil such that the particulate auxiliary material prior to the compressing is directly adjacent to the anode collector carrier foil.

The coating compound may of course be applied to only one side or both sides of the anode collector carrier foil.

The particulate auxiliary material may be selected from the group consisting of lithium ion conductors, $Al_2O_3$, $TiO_2$, $B_2O_3$, boehmite, synthetic diamond dust, and combinations thereof.

A "lithium ion conductor" is understood here to be a compound which is able to conduct lithium ions but does not represent an active material of a lithium-ion battery.

The lithium ion conductor may comprise a material with perovskite structure, a material with garnet structure, a material with a structure derived from a Lithium Super Ionic Conductor (LISICON), a sulfide, an oxide and/or a polymer.

A suitable material with garnet structure is, for example, $Li_7La_3Zr_2O_{12}$.

Candidate materials whose structure is derived from LISICON include, as well as LISICON itself, for example thio-LISICON $Li_{4-x}M_{1-y}M'_yS_4$ with M=Si, Ge, P, and M'=P, Al, Zn, Ga, Sb, and/or NASICON (Sodium (Na) Super Ionic Conductor) of the general formula AMM'P$_3$O$_{12}$ with A=Li$^+$, Na$^+$, K$^+$, Rb$^+$, Cs$^+$, Mg$^{2+}$, Ca$^{2+}$, Sr$^{2+}$, Ba$^{2+}$, H$^+$, H$_3$O$^+$, NH$_4^+$, Cu$^+$, Ag$^+$, Pb$^{2+}$, Cd$^{2+}$, Mn$^{2+}$, Co$^{2+}$, Mn$^{2+}$, Co$^{2+}$, Ni$^{2+}$, Zn$^{2+}$, Al$^{3+}$, Ln$^{3+}$, Ge$^{4+}$, Zr$^{4+}$, Hf$^{4+}$ or unoccupied, M and M'=di, tri, tetra- or pentavalent transition metal ions selected from the group of Zn$^{2+}$, Cd$^{2+}$, Ni$^{2+}$, Mn$^{2+}$, Co$^{2+}$, Fe$^{3+}$, Sc$^{3+}$, Ti$^{3+}$, V$^{3+}$, Al$^{3+}$, In$^{3+}$, Ga$^{3+}$, Y$^{3+}$, Lu$^{3+}$, Ti$^{4+}$, Zr$^{4+}$, Hf$^{4+}$, Sn$^{4+}$, Si$^{4+}$, Ge$^{4+}$, V$^{5+}$, Nb$^{5+}$, Ta$^{5+}$, Sb$^{5+}$, As$^{5+}$, where phosphorus may also be substituted in part by Si or As.

In order to be able to perforate the anode collector carrier foil reliably, the particular auxiliary material more particularly has a Mohs hardness in the range from 2 to 10, preferably a Mohs hardness of greater than 3.0 to 10, for example 3.2 to 10.

The hardness of the particulate auxiliary material may be determined according to DIN EN ISO 14577, in accordance with the method of nanoindentation. Nanoindentation, also described as an instrumented penetration test, is a measurement method in materials testing for determining the hardness of materials at small length scales with a size order in the nanometer range.

The particulate auxiliary material preferably has a morphology which promotes the perforating of the anode collector carrier foil when the coating compound is compressed. For example, the particulate auxiliary material may have at least one edge, one angle, one tip, one point and/or one projection.

Where the particulate auxiliary material is in the form of an agglomerate composed of multiple agglomerated particles, one of the agglomerated particles may take on the function of the tip, the point and/or the projection.

The mean particle size D$_{50}$ of the particulate auxiliary material may be more particularly at least 0.5 times the thickness of the anode collector carrier foil, or preferably at least 0.8 times the thickness of the anode collector carrier foil.

For example, for an anode collector carrier foil thickness of 10 μm, the mean particle size D$_{50}$ of the particulate auxiliary material may be in the range from 5 to 10 μm, or preferably from 7 to 8.5 μm.

The coating compound may comprise an adjuvant selected from the group consisting of synthetic graphite, natural graphite, carbon nanotubes, carbon fibers, soft carbon, hard carbon, and combinations thereof. The adjuvant may enhance the conductivity of the coating compound and so lead to improved performance properties in the anode produced. Moreover, the adjuvant may improve the processing qualities and/or the application qualities of the coating compound.

Where the adjuvant itself has a greater hardness than the anode collector carrier foil, the adjuvant, as well as the particulate auxiliary material, may perforate the anode collector carrier foil.

In order to improve the handling of the coating compound and/or to increase the compatibility of the coating compound with further constituents of the anode, the coating compound may comprise a binder, the binder more particularly being selected from the group consisting of styrene-butadiene rubber (SBR), polyvinylpyrrolidone (PVP), polyamide (PA), polyvinylidene fluoride (PVdF), polyvinylidene fluoride-hexafluoropropylene (PVdF-HFP), polyacrylate, carboxymethylcellulose (CMC), polyimide (PI), PTFE, and combinations thereof.

The binder is tailored in particular to the active material provided in the anode, and also to other components of the electrode. For example, the binder may be hydrophilic, if a water-based coating compound and/or active-material coating compound is to be employed for applying the active material of the anode.

The viscosity of the coating compound may be adjusted purposively via the selection of the binder and the content of the binder in the coating compound. In this way, the behavior of the coating compound may be influenced in a targeted way in each of the coating methods used.

The coating compound may be applied to the anode collector carrier foil by wet coating, dry coating, pressing, laminating, lining, extruding and/or spraying.

The coating compound may comprise an anode active material and/or additionally an active-material coating compound may be applied to the anode collector carrier foil.

The active-material coating compound comprises an anode active material and optionally an active material binder, a solvent and/or additives, more particularly conductivity additives.

The anode active material may be selected from the group consisting of carbon-containing materials, silicon, silicon composite, silicon suboxide, silicon alloys, lithium, lithium alloys, aluminum alloys, indium, indium alloys, tin, tin alloys, cobalt alloys, niobium pentoxide, titanium dioxide, titanates, for example lithium titanate (Li$_4$Ti$_5$O$_{12}$), tin dioxide, and mixtures thereof.

The anode active material is preferably selected from the group consisting of synthetic graphite, natural graphite, graphene, mesocarbon, doped carbon, hard carbon, soft carbon, fullerene, silicon-carbon composite, silicon, surface-coated silicon, silicon suboxide, silicon alloys, lithium, aluminum alloys, indium, tin alloys, cobalt alloys, and mixtures thereof.

The anode active material may at least partly take on the function of the particulate auxiliary, if the anode active material has a higher hardness than the anode active carrier foil and is particulate—for example, if the anode active material comprises particulate silicon.

The compositions of the coating compound and also of the active-material coating compound are tailored to one another in accordance with this disclosure in order to maximize the performance capacity of the anode.

In one variant, the coating compound is applied temporally before the active-material coating compound to the anode collector carrier foil.

For example, first the coating compound is applied in a first layer to the anode collector carrier foil and then the active-material coating compound is applied in a second layer over the first layer. The ratio of the thickness of the first layer to the second layer is situated in particular in the range from 1:2 to 1:100, preferably from 1:3 to 1:40.

In one variant, the coating compound is compressed before the application of the active-material coating compound, and in this way the at least one aperture is generated by the auxiliary material in the anode collector carrier foil. In this variant, the active-material coating compound that is applied after the compression of the coating compound is preferably compressed in a subsequent, second compression step, where the auxiliary material in the second compression step may additionally perforate and/or cut up the anode collector carrier foil.

Where the coating compound and the active-material coating compound are applied using a coating apparatus having at least two nozzles, the coating compound and the active-material coating compound being metered via different nozzles, the first and second layers may be applied using the same coating apparatus, preferably with a time lag of not more than a few seconds.

The coating compound may alternatively be sprayed onto the anode collector carrier foil via a spraying nozzle, more particularly directly before the active-material coating compound is applied.

In a further variant, the coating compound and the active-material coating compound may be applied simultaneously to the anode collector carrier foil.

For example, the coating compound may be mixed with the active-material coating compound to form an overall compound, prior to the application, and the overall compound may be applied to the anode collector carrier foil, by a nozzle, for example.

After the overall compound has been applied, the particulate auxiliary material contained in the coating compound may settle by gravity, and so even when using an overall compound it is possible to ensure direct contact between anode collector carrier foil and particulate auxiliary material prior to compressing.

To adjust the settling rate of the particulate auxiliary material in the overall compound, in other words the rate of the gravity-induced settling of the auxiliary material in the overall compound, it is possible to adapt the porosity of the overall compound, of the coating compound and/or of the active-material coating compound. This may be accomplished through selection of the binder and/or through addition of a suitable solvent.

The object of this disclosure may be further achieved by a lithium-ion battery comprising at least one anode obtainable by a method as described above.

As a result of the apertures in the anode collector carrier foil that are generated in the anode production method, the lithium-ion battery of the disclosure may exhibit uniform and complete wetting of the at least one anode with electrolyte, so making it possible for the lithium-ion battery of the invention to exhibit high current-carrying capacity, high maximum charging and discharging rates, good cycling stability, and a long lifetime.

The electrolyte may comprise in particular a solvent and at least one conductive lithium salt dissolved therein.

The solvent is preferably inert. Suitable solvents are, for example, organic solvents such as ethylene carbonate, propylene carbonate, butylene carbonate, dimethyl carbonate, diethyl carbonate, ethyl methyl carbonate, fluoroethylene carbonate (FEC), sulfolane, 2-methyltetrahydrofuran and 1,3-dioxolane.

It is also possible to use ionic liquids as solvents. Such ionic liquids contain exclusively ions. Preferred cations, which in particular may be alkylated, are imidazolium, piperidinium, pyrrolidinium, guanidinium, uronium, thiuronium, piperidinium, morpholinium, sulfonium, ammonium and phosphonium cations. Examples of anions which can be used are halide, tetrafluoroborate, trifluoroacetate, triflate, hexafluorophosphate, phosphinate and tosylate anions.

Illustrative ionic liquids include the following: N-methyl-N-propylpiperidinium bis(trifluoromethylsulfonyl)imide), N-methyl-N-butylpyrrolidinium bis(trifluoromethylsulfonyl)imide, N-butyl-N-trimethylammonium bis(trifluyoromethylsulfonyl)imide, triethylsulfonium bis(trifluoromethylsulfonyl)imide and N,N-diethyl-N-methyl-N-(2-methoxyethyl)ammonium bis(trifluoromethylslfonyl)imide.

In one variant, two or more of the above-stated liquids may be used.

Preferred conductive lithium salts are lithium salts which have inert anions and which are preferably nontoxic. Suitable lithium salts are more particularly lithium hexafluorophosphate ($LIPF_6$), lithium tetrafluoroborate ($LiBF_4$), and mixtures of these salts.

The lithium-ion battery may be a traction battery in a vehicle. The lithium-ion battery may also be used in a wearable, an e-bike, a smart phone, a power tool, a laptop, an ebook reader, a mobile power bank or a stationary energy store.

Further advantages and characteristics of the invention are apparent from the following description of a preferred embodiment, which is not to be understood in a limiting sense, and also from the drawings.

DETAILED DESCRIPTION OF THE DRAWINGS

Figure 1:
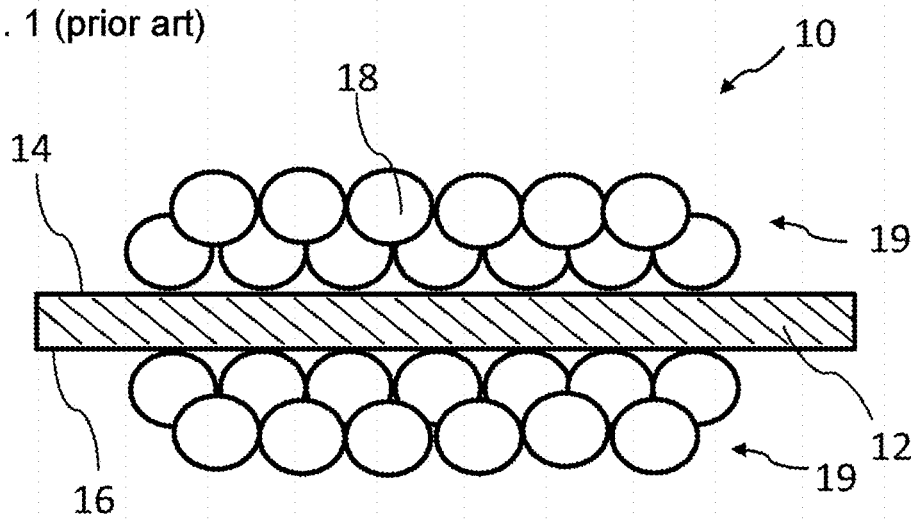
FIG. 1 shows schematically a sectional view of an anode as known in the prior art.

FIG. 1 shows a schematic sectional view of an anode 10, not according to the disclosure, of a lithium-ion battery of the kind known in the prior art.

The anode 10 comprises an anode collector carrier foil 12, which also serves as a current diverter of the anode 10.

The anode collector carrier foil 12 is more particularly a copper foil.

On a first main face 14 and also on a second main face 16, opposite the first main face 14, of the anode collector carrier foil 12, an anode active material 18 is applied in the form of an anode film 19.

The anode active material 18 may be any material commonplace in the prior art that is capable of reversibly accepting and delivering lithium ions.

As can be seen in FIG. 1, the anode collector carrier foil 12 has no apertures at all. Accordingly, the anode collector carrier foil 12 is impervious to an electrolyte, and so the wetting of the anode 10 with the electrolyte in a lithium-ion battery takes place only slowly and/or incompletely.

Figure 2:
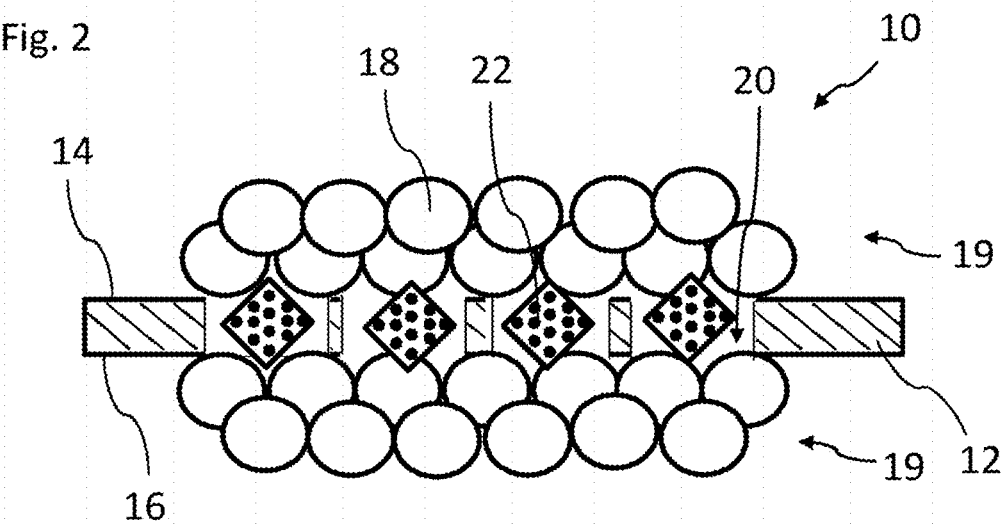
FIG. 2 shows schematically a sectional view of an anode as may be produced using a method of the disclosure.

FIG. 2 represents an anode 10 of the kind obtainable by a method of the invention for producing an anode.

For components which are substantially analogous to the prior art, identical reference signs are used, and reference is made to the observations above; below, consequently, only differing features and components are explained in more detail.

The anode 10 represented in FIG. 2 has an anode collector carrier foil 12 with multiple apertures 20, which each extend through the entire thickness of the anode collector carrier foil 12, hence from the first main face 14 to the second main face 16.

There may of course also be a number of apertures 20 which differ from the embodiment shown in FIG. 2, provided at least one aperture 20 is present for the passage of electrolyte through the anode collector carrier foil 12.

Additionally, the anode 10 has a particulate auxiliary material 22 which is disposed at least partially in the apertures 20.

The particulate auxiliary material 22 is selected from the group consisting of lithium ion conductors, $Al_2O_3$, $TiO_2$, $B_2O_3$, boehmite, synthetic diamond dust, and combinations thereof, and has a mean particle size $D_{50}$ in the order of magnitude of the thickness of the anode collector carrier foil 12, and also has a Mohs hardness in the range from 2 to 10, more particularly a Mohs hardness in the range from greater than 3 to 10—for example, 3.2 to 10.

The apertures 20 enable passage of electrolyte from the first main face 14 in the direction of the second main face 16 and also from the second main face 16 in the direction of the first main face 14, and so the anode as represented in FIG. 2 can be wetted more rapidly and more uniformly with electrolyte than is the case with the anode 10 known from the prior art, as represented in FIG. 1.

Explained in more detail below is the method of the invention for producing the anode 10 as is shown in FIG. 2.

First of all, the anode collector carrier foil 12 is provided (cf. step S1 in FIG. 3), with the anode collector carrier foil 12 corresponding to that from FIG. 1, in other words as yet having none of the apertures 20 (cf. FIG. 2).

Figure 3:
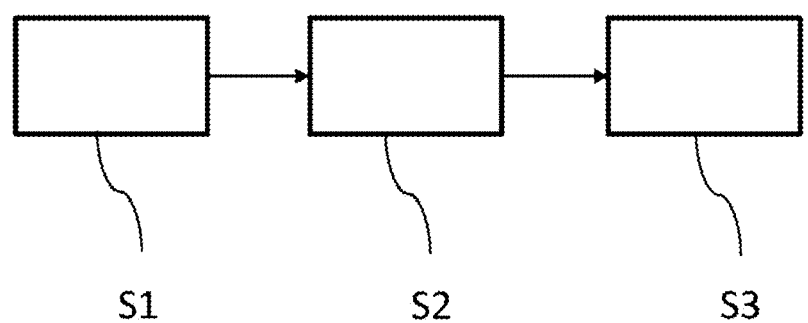
FIG. 3 shows a block diagram of the method of the disclosure for producing the anode from FIG. 2.

Subsequently, a coating compound is applied to the first main face 14 of the anode collector carrier foil 12 (cf. step S2 in FIG. 3 and also FIG. 4).

Figure 4:
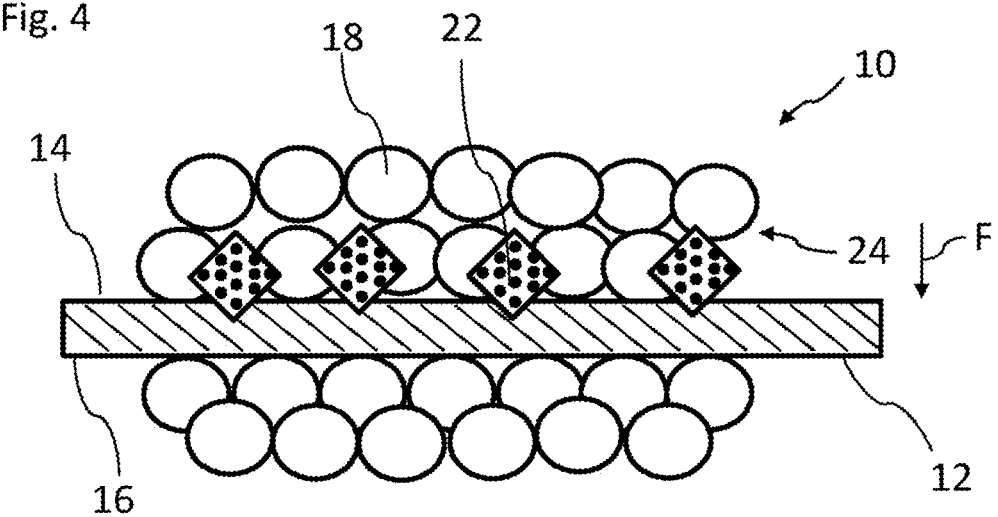
FIG. 4 shows, schematically, a sectional view of an intermediate stage in the production of the anode from FIG. 2.

As shown more closely in FIG. 4, the application of the coating compound in the embodiment represented takes place via the application of an overall compound 24 to the first main face 14, with the overall compound 24 comprising the coating compound and also an active-material coating compound.

The coating compound comprises the particulate auxiliary material 22 and also a binder, which is not shown in any more detail. The binder is selected from the group consisting of styrene-butadiene rubber (SBR), polyvinylpyrrolidone (PVP), polyamide (PA), polyvinylidene fluoride (PVdF), polyvinylidene fluoride-hexafluoropropylene (PVdF-HFP), polyacrylate, carboxymethylcellulose (CMC), polyimide (PI), PTFE, and combinations thereof.

The coating compound may further comprise an adjuvant which is selected from the group consisting of synthetic graphite, natural graphite, carbon nanotubes, carbon fibers, soft carbon, hard carbon, and combinations thereof. The adjuvant may increase the conductivity of the coating compound and also improve its processing qualities and/or application qualities.

The active-material coating compound comprises the anode active material 18 and also an active material binder or electrode binder, this binder not being shown in any more detail.

Following application of the overall compound 24, the particulate auxiliary material 22 settles owing to gravity, and so it is directly adjacent to the anode collector carrier foil 12, as shown in FIG. 4.

In principle, the coating compound with the particulate auxiliary material 22, and the active-material coating compound, may also be applied individually in succession on the anode collector carrier foil 12.

The coating compound, the active-material coating compound and/or the overall compound 24 may be applied to the anode collector carrier foil 12 by wet coating, dry coating, pressing, laminating, lining, extruding and/or spraying.

Applied on the second main face 16, as shown in FIG. 4, is only an active-material coating compound. In principle, of course, it would be possible to use an overall compound 24 or a coating compound on the second main face 16 as well.

Starting from the intermediate stage shown in FIG. 4, the coating compound, more precisely the overall compound 24 in the embodiment shown, is compressed to form the anode film 19 (cf. FIG. 2), by calendering (cf. step S3 in FIG. 3), for example.

In this case, a force F is exerted on the overall compound 24, as indicated by an arrow in FIG. 4, thereby pressing the particulate auxiliary material 22 into the anode collector carrier foil 12 and perforating this foil, owing to the higher hardness of the particulate auxiliary material 22 in comparison to the anode collector carrier foil 12, in order to produce the apertures 20.

The method of the disclosure thus makes it possible to generate the apertures 20, which can be used for improving the wetting, in situ during the production of the anode 10.

The invention claimed is:

1. A method for producing an anode for a lithium-ion battery, the method comprising:
   providing an anode collector carrier foil;
   applying a coating compound comprising a particulate auxiliary material to at least one main face of the anode collector carrier foil, the particulate auxiliary material being selected from the group consisting of lithium ion conductors, $Al_2O_3$, $TiO_2$, $B_2O_3$, boehmite, synthetic diamond dust, and combinations thereof; and
   compressing the coating compound to form an anode film on the anode collector carrier foil, the anode collector carrier foil being perforated by the particulate auxiliary material during the compression of the coating compound.

2. The method according to claim 1, wherein the particulate auxiliary material has a Mohs hardness in a range from 2 to 10.

3. The method according to claim 2, wherein the Mohs hardness is in a range from 3.0 to 10.

4. The method according to claim 1, wherein
   the coating compound comprises an adjuvant selected from the group consisting of synthetic graphite, natural graphite, carbon nanotubes, carbon fibers, soft carbon, hard carbon, and combinations thereof.

5. The method according to claim 1, wherein
   the coating compound comprises a binder selected from the group consisting of styrene-butadiene rubber (SBR), polyvinylpyrrolidone (PVP), polyamide (PA), polyvinylidene fluoride (PVdF), polyvinylidene fluoride-hexafluoropropylene (PVdF-HFP), polyacrylate, carboxymethylcellulose (CMC), polyimide (PI), PTFE, and combinations thereof.

6. The method according to claim 1, wherein
   applying the coating compound to the anode collector carrier foil comprises wet coating, dry coating, pressing, laminating, extruding and/or spraying.

7. The method according to claim 1, wherein
   the coating compound comprises an anode active material.

8. The method according to claim 1, further comprising applying an active-material coating compound to the anode collector carrier foil.

9. The method according to claim 8, wherein
   the coating compound is applied to the anode collector carrier foil temporally before the active-material coating compound is applied to the anode collector carrier foil.

10. The method according to claim 9, wherein
    the coating compound is applied in a first layer to the anode collector carrier foil; and
    the active-material coating compound is applied in a second layer over the first layer.

11. The method according to claim 10, wherein
    a ratio of the thickness of the first layer to the second layer is in a range from 1:2 to 1:100.

12. The method according to claim 11, wherein
    the ratio is in a range from 1:3 to 1:40.

13. The method according to claim 9, wherein
the coating compound and the anode coating compound are applied using a coating apparatus having at least two nozzles, the coating compound and the active-material coating compound being metered via different nozzles.

14. The method according to claim 8, wherein
the coating compound and the active-material coating compound are applied simultaneously to the anode collector carrier foil.

15. The method according to claim 14, further comprising:
prior to application to the anode collector carrier foil, mixing the coating compound with the active-material coating compound to form an overall compound; and
applying the overall compound to the anode collector carrier foil using a nozzle.

16. The method according to claim 1, wherein
the particulate auxiliary material has at least one edge, one angle, one tip, one point and/or one projection.

17. The method according to claim 1, wherein
the particulate auxiliary material comprises an agglomerate composed of multiple agglomerated particles.

18. The method according to claim 1, wherein
a mean particle size $D_{50}$ of the particulate auxiliary material is at least 0.5 times a thickness of the anode collector carrier foil.

19. A method for producing an anode for a lithium-ion battery, the method comprising:
providing an anode collector carrier foil;
applying a coating compound comprising a particulate auxiliary material to at least one main face of the anode collector carrier foil;
after applying the coating compound, applying an active-material coating compound to the anode collector carrier foil; and
compressing the coating compound and the active-material coating compound to form an anode film on the anode collector carrier foil, the anode collector carrier foil being perforated by the particulate auxiliary material during the compression.

20. A method for producing an anode for a lithium-ion battery, the method comprising:
providing an anode collector carrier foil;
applying a coating compound comprising a particulate auxiliary material to at least one main face of the anode collector carrier foil, the particulate auxiliary material comprising an agglomerate composed of multiple agglomerated particles; and
compressing the coating compound to form an anode film on the anode collector carrier foil, the anode collector carrier foil being perforated by the particulate auxiliary material during the compression of the coating compound.

* * * * *